United States Patent
Brouns et al.

(10) Patent No.: US 6,839,415 B2
(45) Date of Patent: *Jan. 4, 2005

(54) METHOD OF ESTABLISHING A VOICE/DATA CALL OVER A VOICE/DATA CHANNEL

(75) Inventors: Dirk Brouns, Kinrooi (BE); Michel Van Ackere, Sint-Niklaas (BE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,887

(22) Filed: Jan. 11, 1999

(65) Prior Publication Data

US 2002/0067814 A1 Jun. 6, 2002

(30) Foreign Application Priority Data

Jan. 12, 1998 (EP) .............................. 98440003

(51) Int. Cl.[7] .............................................. H04M 3/42
(52) U.S. Cl. .............................. 379/201.01; 379/201.02
(58) Field of Search ......................... 379/88.17, 93.01, 379/93.12, 93.14, 201, 213, 900, 908, 218.01, 88.13, 93.09, 265.09; 370/352

(56) References Cited

U.S. PATENT DOCUMENTS

| 4,608,460 | A | * | 8/1986 | Carter et al. .................. 379/71 |
|---|---|---|---|---|
| 4,839,919 | A | * | 6/1989 | Borges et al. ............ 379/93.23 |
| 4,899,373 | A | | 2/1990 | Lee et al. |
| 5,208,848 | A | | 5/1993 | Pula |
| 5,341,411 | A | * | 8/1994 | Hashimoto ................ 379/88.19 |
| 5,440,619 | A | * | 8/1995 | Cann ......................... 379/93.11 |
| 5,519,768 | A | | 5/1996 | Moquin et al. |
| 5,544,236 | A | | 8/1996 | Andruska et al. |
| 5,583,922 | A | * | 12/1996 | Davis et al. .............. 379/93.09 |
| 5,657,377 | A | | 8/1997 | Pinard et al. |
| 5,745,553 | A | * | 4/1998 | Merville et al. ........ 379/201.05 |
| 5,796,810 | A | * | 8/1998 | Lim et al. ............... 379/142.02 |
| 5,797,092 | A | * | 8/1998 | Cox et al. ................. 455/404.1 |
| 5,825,867 | A | * | 10/1998 | Epler et al. ............. 379/215.01 |
| 5,838,682 | A | * | 11/1998 | Dekelbaum et al. ......... 370/401 |
| 5,850,433 | A | * | 12/1998 | Rondeau ...................... 379/201 |
| 5,884,032 | A | * | 3/1999 | Bateman et al. ............ 709/204 |
| 5,926,537 | A | * | 7/1999 | Birze .......................... 379/252 |
| 5,946,386 | A | * | 8/1999 | Rogers et al. .......... 379/265.09 |
| 5,991,394 | A | * | 11/1999 | Dezonno et al. ........ 379/265.09 |
| 6,230,287 | B1 | * | 5/2001 | Pinard et al. ................... 714/31 |
| 6,263,071 | B1 | * | 7/2001 | Swan et al. .................. 379/372 |
| 6,292,548 | B1 | * | 9/2001 | Jreij et al. ................ 379/93.17 |

FOREIGN PATENT DOCUMENTS

WO  WO 95/32577  11/1995

* cited by examiner

*Primary Examiner*—Bing Q. Bui
(74) *Attorney, Agent, or Firm*—Sughrue Mion, PLLC

(57) ABSTRACT

A method of establishing a voice/data call between at least two subscribers is disclosed. Prior to the establishment of the connection between subscriber 1 and subscriber 2 via exchanges, a first time window is inserted in which subscriber 1 requests specific execution of the call to be established.

7 Claims, 1 Drawing Sheet

METHOD OF ESTABLISHING A VOICE/ DATA CALL OVER A VOICE/DATA CHANNEL

BACKGROUND OF THE INVENTION

This invention relates to a method of establishing a voice/data call over a voice/data channel as set forth in the preamble of the main claim.

In existing telephone networks, a subscriber establishes a connection to another subscriber in which the service used is predefined. It is not possible for the subscriber to select the type of connection, such as a standard connection or a connection to a voice mailbox, prior to the establishment of the connection. The subscriber either is forced to dial a specific number in order to get his specific call request executed, or he can indicate his request during the call by signaling. In either case, the subscriber will already have established a connection, either to another terminal or to a switching unit. It is not possible for the subscriber to indicate to the network that he wants a specific execution of his call request as long as the connection is not established. It is known to implement a call-screening function in which a center of the network receives the incoming number and compares it with stored data. This method makes it possible to carry out different service actions prior to the establishment of a call. The center checks the incoming number to determine, for example, whether the called subscriber wants to accept this call. This check takes place at the center and must be applied for by the subscriber and installed by the network operator in advance.

Another solution is described in U.S. Pat. No. 5,544,236. Here the subscriber, by dialing a specific number, is connected to a processor which is capable of selecting different service features for a connection. The processor offers several possibilities, and the subscriber can interactively select the service he desires for the call to be established. When the specific number is dialed, the subscriber is connected to the processor. A connection is thus established, i.e., the subscriber incurs costs for the establishment of the connection. The different service features can be selected by keypad or voice entries.

SUMMARY OF THE INVENTION

Compared with the prior art, the method according to the invention, with the characterizing features of the main claim, has the advantage that a subscriber can indicate his request for a specific execution of the call prior to the establishment of the directly related connection. It is not necessary to dial specific numbers in order to choose a specific execution of the call. To accomplish this, prior to the establishment of a connection, a first time window is introduced by the network in which the subscriber can indicate that he desires specific execution for the call. A subscriber who wants a standard execution of the call will only dial the destination number, and call setup will only be delayed by the nearly imperceptible time of the first time window.

By the measures recited in the subclaims, the method set forth in the main claim is further developed and improved. According to a particularly advantageous aspect of the invention, a signal can be sent to the exchange within the first time window, and only upon recognition of such a signal at the exchange will a second time window be opened in which the subscriber can communicate specific further signal sequences to be recognized by the exchange. According to a further advantageous aspect of the invention, simplified signal sequences from a subscriber CAN be listened to within the second time window and may result in dispatching the call to dedicated servers dealing with the specific execution of the call. Actually, if the time length of time window 2 is zero the signal initiated in window 1 directly launches the call to one dedicated server.

To keep the time delay in the standard call setup as short as possible, it is advantageous to open the first time window for only a limited period of time, preferable a few seconds. Only then the second time window can be opened until the subscriber has communicated a complete specific further signal sequence. Alternatively, it is possible to set a defined length of the second time window.

In any case it is of advantage that the method according to the invention requires no action by the subscriber to perform standard call setup, and that after expiration of the first time window without detection of a signal from subscriber 1, standard call setup is resumed.

BRIEF DESCRIPTION OF THE DRAWINGS

An embodiment of the invention is illustrated in the accompanying drawing and will now be described in more detail.

DETAILED DESCRIPTION OF THE INVENTION

Figures 1, 2:
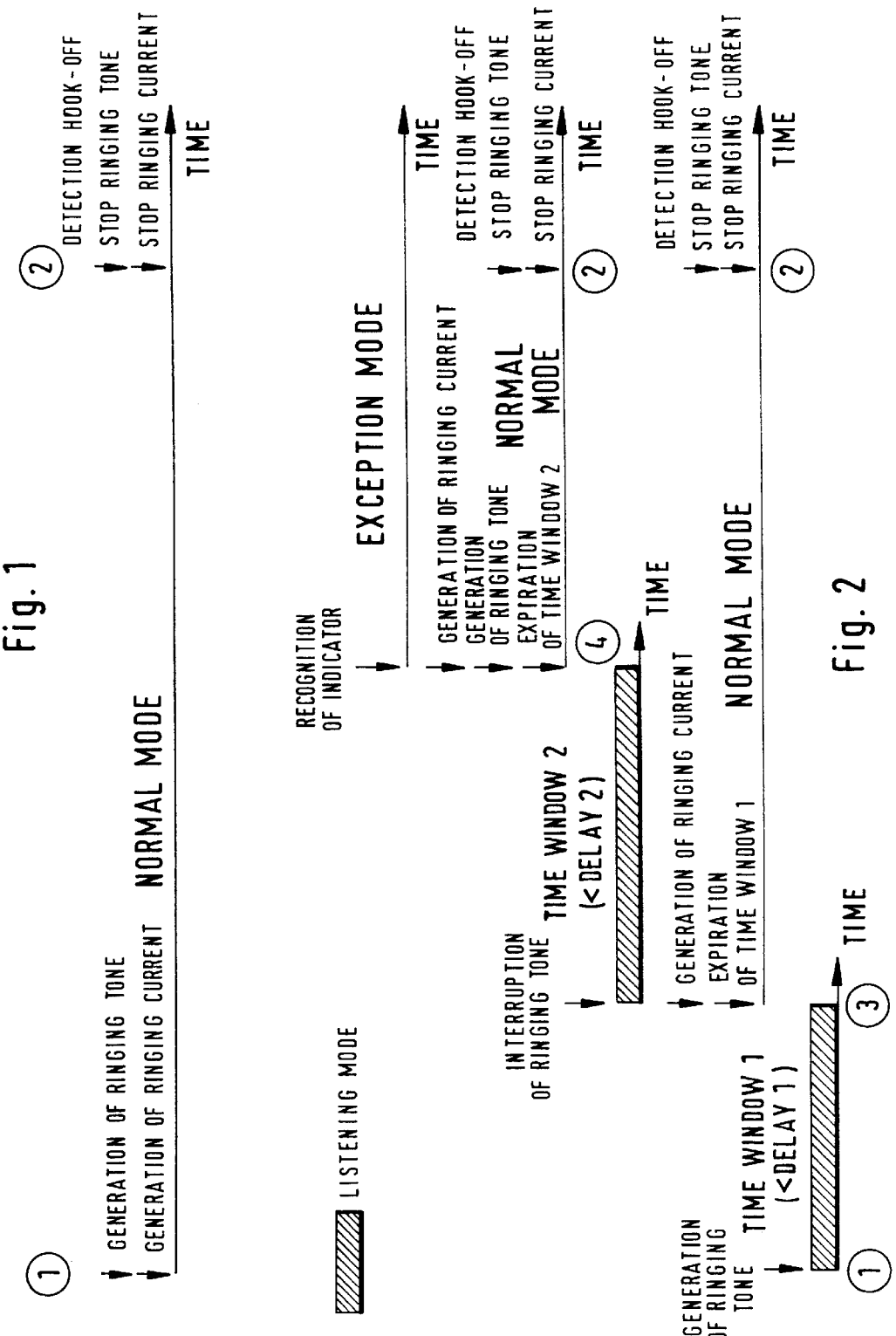
FIG. 1 shows the time sequence of call setup in the prior art.
FIG. 2 shows call setup according to the invention.

FIG. 1 illustrates the time sequence of standard call setup. At point 1, which signals the beginning of the call setup, ringing tone is generated for the calling subscriber and ringing current is generated for the called subscriber. At point 2, the called subscriber answers and both ringing current for the called subscriber and ringing tone for the calling subscriber are stopped.

FIG. 2 illustrates call setup according to the invention. At point 1, subscriber 1 signals his request to establish a call. The telephone network generates ringing tone for subscriber 1, but does not yet generate ringing current for subscriber 2. During a first time window, the telephone network waits for action by subscriber 1. During that time, no connection exists to the called subscriber 2. At point 3, the first time window is closed, and should subscriber 1 not have indicated a demand for a specific execution of the call, standard call setup is resumed, meaning that ringing current is generated for subscriber 2. This is followed, at point 3, by stopping both ringing current for subscriber 2 and ringing tone for subscriber when subscriber 2 operates his terminal. If subscriber 1 indicated during the first time window that he wants a specific execution of the call, the connection is not established immediately, but call setup is further interrupted for a second time window. (Note that delay 1 as referred to in FIG. 1 is actually the maximum time that window 1 can last. This happens when the subscriber waits for standard call setup) If subscriber 1 has signaled that he wants specific execution of the call, ringing tone for subscriber 1 is stopped at point 3 and subscriber 1 is given the opportunity to communicate his requests to the exchange by entry of key combinations or by voice entry. After expiration of the second time window, there are two possibilities for the further course of call setup. If, for example, subscriber 1 did not signal a specific request in the second time window or, because of an input error, did not enter a specific signal sequence that can be recognized by the exchange, ringing tone for subscriber 1 and ringing current for subscriber 2 will be generated at point 4 as in the case of standard call setup.

If the entry of a specific signal sequence during time window 2 was successful, the specific signal sequence will be recognized at point 4 and the call will be dispatched to a dedicated server dealing with the specific execution of the call (i.e. the exception mode).

When subscriber 1 has entered the complete number for the call to be established, the first time window is opened at the destination exchange (responsible for generating ringing tone for subscriber 1 and ringing current for subscriber 2), making available the possibility for subscriber 1 to indicate a request for a specific execution of the call. Depending on the implementation of the network operator's service offer, a call which takes place in the exception mode can be switched back to a normal mode. In time window 1, the subscriber can indicate his request for a specific service by operating a key, such as the *-key, or by entering a digit. It is also possible to open the second time window by operating an arbitrary key of the terminal. The specific signal sequence to be entered in the second time window may be a digit, a sequence of digits, or a voice input.

The most important difference from the prior art is the introduction of the first time window during call setup. This first time window enables the network to comply with requests of the subscriber. Unlike the time delays of the second time window, the first time window must be very short. It may be a few seconds long at the most, so that a subscriber who wants standard call setup need not put up with an unacceptable time delay which in addition would occupy resources of the network for too long a period of time. Time window 2 is chosen sufficiently long to give subscriber 1 the opportunity to enter a specific signal sequence with a length of several digits. The time it takes the subscriber to communicate his request to the network is of minor importance for the further call establishment.

An example of an exception mode is the dialing of a subscriber's number with the intention to reach his voice mail box instead of the subscriber himself.—A subscriber with a voice mailbox has a different mailbox number in addition to his subscriber number. The insertion of the time window 1 enables subscriber 1 to communicate his desire to leave a spoken message in the voice mailbox of subscriber 2. The network then switches to the exception mode, and a connection is established from subscriber 1 to the voice mailbox of subscriber 2 without subscriber 1 having to know or remember the number of the voice mailbox.

The proposed solution offers a simple and direct way of extending services with different additional features. This service extension can be used across a multitude of telecommunications networks requiring almost no additional effort on the part of subscriber 1. In particular, the proposed solution can be executed from any terminal. The method according to the invention can be implemented at low cost in any network infrastructure. It only requires small modifications in the handling of the calls.

What is claimed is:

1. A method of establishing at least one of voice and data call over a channel which interconnects at least two subscribers via at least one exchange, wherein after requesting a call to be established between subscriber 1 and subscriber 2, said request comprising entry by subscriber 1 of a call address of subscriber 2, and prior to establishing a connection between subscriber 1 and subscriber 2, a first time window is inserted in which subscriber 1 is given an option to request specific execution of the call to be established, and, if subscriber 1, before closure of the window, does not request any specific execution of the call, the call is established with a standard call setup.

2. A method of establishing at least one of voice and data call as claimed in claim 1, characterized in that within the first time window, a signal is sent from subscriber 1 to an exchange, and that after recognition of the signal at the exchange, a second time window is opened.

3. A method of establishing at least one of voice and data call as claimed in claim 2, characterized in that within the second time window, specific further signal sequences can generated by subscriber 1 which are recognized at the exchange and result in dispatching the call to dedicated servers dealing with a specific execution of the call.

4. A method of establishing at least one of voice and data call as claimed in claim 1, characterized in that the first time window is opened for a limited period of time.

5. A method of establishing at least one of voice and data call as claimed in claim 1 characterized in that the second time window exists for a defined period of time beyond or until termination of the specific signal sequence as communicated by subscriber 1.

6. A method of establishing at least one of voice and data call as claimed in claim 1, characterized in that without signaling by subscriber 1 to request for specific execution of the call, standard call setup is executed.

7. A method of establishing at least one of voice and data call as claimed in claim 1, wherein said first time window is inserted after generating a ringing tone for subscriber 1 and prior to generating a ringing current for subscriber 2.

* * * * *